(12) United States Patent
Umeda

(10) Patent No.: US 7,247,389 B2
(45) Date of Patent: Jul. 24, 2007

(54) HEAT-SHRINKABLE FILMS

(75) Inventor: Hideaki Umeda, Osaka (JP)

(73) Assignee: Fuji Seal International Inc., Osaka-shi (JP)

( * ) Notice: Subject to any disclaimer, the term of this patent is extended or adjusted under 35 U.S.C. 154(b) by 0 days.

(21) Appl. No.: 11/377,401

(22) Filed: Mar. 17, 2006

(65) Prior Publication Data

US 2006/0222874 A1 Oct. 5, 2006

(30) Foreign Application Priority Data

Mar. 31, 2005 (JP) ............................ 2005-104227

(51) Int. Cl.
- B32B 27/08 (2006.01)
- B32B 27/32 (2006.01)
- B32B 27/36 (2006.01)

(52) U.S. Cl. ..................... 428/483; 428/34.9; 428/480; 428/910; 525/210; 525/240

(58) Field of Classification Search ..................... None
See application file for complete search history.

(56) References Cited

U.S. PATENT DOCUMENTS

| | | | |
|---|---|---|---|
| 5,324,467 A * | 6/1994 | Anderson, II | 264/173.15 |
| 5,702,784 A * | 12/1997 | Nishimura et al. | 428/34.9 |
| 6,210,765 B1 * | 4/2001 | Tanaka et al. | 428/35.2 |
| 6,274,228 B1 * | 8/2001 | Ramesh et al. | 428/213 |
| 6,436,496 B1 * | 8/2002 | Rackovan et al. | 428/34.9 |
| 6,737,171 B2 * | 5/2004 | Seta et al. | 428/516 |
| 6,808,822 B2 * | 10/2004 | Rajan et al. | 428/516 |
| 2002/0068137 A1 * | 6/2002 | Paleari et al. | 428/34.9 |
| 2002/0098303 A1 * | 7/2002 | Rackovan et al. | 428/34.9 |
| 2003/0120014 A1 * | 6/2003 | Seta et al. | 526/348.1 |

FOREIGN PATENT DOCUMENTS

| | | |
|---|---|---|
| DE | 10128711 | 12/2002 |
| JP | 2000-159946 | * 6/2000 |
| WO | WO97/30903 | 8/1997 |
| WO | WO98/32598 | 7/1998 |
| WO | WO00/12287 | 3/2000 |
| WO | WO02/45956 | 6/2002 |
| WO | WO 03/008184 | * 1/2003 |

OTHER PUBLICATIONS

European Search Report dated Sep. 14, 2006.

* cited by examiner

*Primary Examiner*—Vivian Chen
(74) *Attorney, Agent, or Firm*—Armstrong, Kratz, Quintos, Hanson & Brooks, LLP.

(57) ABSTRACT

A heat-shrinkable film includes outer layers containing a polyester resin, and at least one inner layer being arranged between the outer layers and containing an olefinic resin including at least one ethylene-propylene-butene terpolymer. The film has an interlayer bonding strength between the inner layer and the outer layer of 3.0 N/15-mm or more. The inner layer may contain the ethylene-propylene-butene terpolymer in an amount of 45 percent by weight or more based on the total weight of the inner layer. The heat-shrinkable film is excellent in strength, abrasion resistance, solvent resistance, dimensional stability, and optical transparency, exhibits high shrinkability and high flexibility as a result of heating, and thereby yields beautiful finish after shrinkage. The heat-shrinkable film can be suitably recycled after use.

2 Claims, 1 Drawing Sheet

HEAT-SHRINKABLE FILMS

BACKGROUND OF THE INVENTION

1. Field of the Invention

The present invention relates to heat-shrinkable films used as materials for shrink labels that are applied typically to containers.

2. Description of the Related Art

Shrink labels containing heat-shrinkable films as base films have been widely used as labels to be applied to containers typically for drinks and condiments. Heat-shrinkable films for shrink labels generally contain polyester resins or polystyrenic resins, and these resins can highly shrink. However, films containing polyester resins have high shrinkage percentages and high shrinkage stress, must be shrunk under severe conditions for beautiful finish and thereby are poor in workability. Films containing polystyrenic resins can easily beautifully finished but have poor dimensional stabilities in storage. Thus, they must be stored under severe control and are poor in handleability. Certain heat-shrinkable films are multilayer films containing layers of different resins, for adjusting film properties such as strength and shrinkability. Examples of such multilayer films are films formed by lamination; and co-extruded films having an adhesive layer. These films, however, have low maximal shrinkage percentages due to the adhesive layer. Therefore, labels containing these films are unsuitable for being applied to portions or dimensions of adherends which must highly shrink, since beautiful finish may not be obtained. In other words, these labels can only be applied to limited portions of the adherends or applied to adherends having limited shapes.

As co-extruded films containing different resins and having no adhesive layer, Japanese Unexamined Patent Application Publication (JP-A) No. 2000-159946 discloses a heat-shrinkable label containing a multilayer film of an amorphous resin layer and an olefinic resin layer, and JP-A No. 07-137212 discloses a heat-shrinkable label containing a multilayer film of a polyester resin layer and a styrenic resin layer. However, the former label has a low interlayer bonding strength, therefore requires an adhesive layer in actual use, and, in addition, fails to achieve a high shrinkage percentage. The latter film is hard and has low flexibility, and the resulting label after shrinkage may often invite problems such as cracking. In addition, containers, typically as PET bottles (poly(ethylene terephthalate) bottles) with the latter label are unsuitable for recycling by separating and recovering the containers from the label using the difference in specific gravity therebetween, since the latter label has a specific gravity much greater than 1.0 and cannot be significantly separated from such PET bottles.

SUMMARY OF THE INVENTION

Accordingly, an object of the present invention is to provide a heat-shrinkable film that is excellent in strength, abrasion resistance, solvent resistance, dimensional stability, and optical transparency, exhibits high shrinkability and high flexibility as a result of heating, and thereby yields beautiful finish after shrinkage. The heat-shrinkable film is also suitable for recycling after use when applied to containers.

After intensive investigations to achieve the above objects, the present inventors have found that an inner layer and an outer layer having specific compositions can firmly adhere to each other without the interposition of an adhesive layer, an optically transparent film can be easily obtained from the inner layer and the outer layer, and the resulting film is resistant to delamination and interlayer displacement upon shrinkage to a high degree. The present invention has been achieved based on these findings.

Specifically, the present invention provides a heat-shrinkable film including outer layers containing a polyester resin, and at least one inner layer being arranged between the outer layers and containing an olefinic resin containing at least one ethylene-propylene-butene terpolymer, in which the film has an interlayer bonding strength between the inner layer and the outer layer of 3.0 N/15-mm or more. The inner layer may contain 45 percent by weight or more of the ethylene-propylene-butene terpolymer based on the total weight of the inner layer.

The heat-shrinkable film according to the present invention contains an inner layer and outer layers bonded with sufficient strength, is thereby resistant to delamination, can have an increased center sealing strength and prevent interlayer displacement upon shrinkage to a high degree. The film does not need an adhesive layer, thereby has excellent flexibility, and can fit the shape of an adherend surface upon shrinkage to yield a beautiful finish. In addition, an optically transparent film can be easily obtained by this configuration. The film is suitable for recycling, since it can be easily separated from an adherend after use by using the difference in specific gravity therebetween.

Further objects, features and advantages of the present invention will become apparent from the following description of the preferred embodiments with reference to the attached drawings.

DESCRIPTION OF THE PREFERRED EMBODIMENTS

Figure 1:
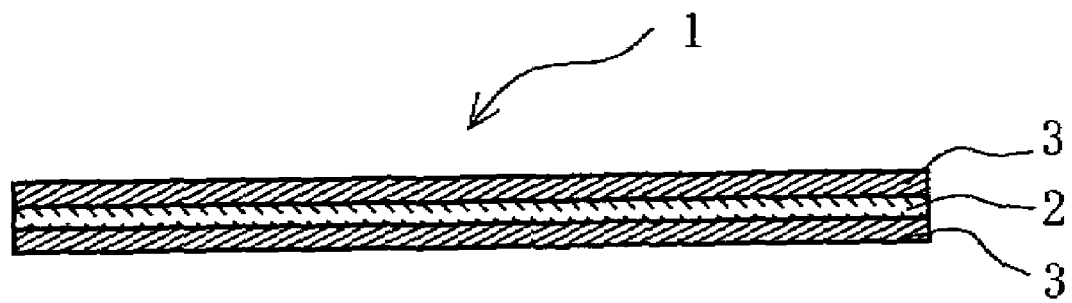
FIG. 1 is a schematic cross-sectional view of a heat-shrinkable film as an embodiment of the present invention.

Preferred embodiments of the present invention will be illustrated with reference to the attached drawings. FIG. 1 is a schematic cross-sectional view of a heat-shrinkable film as an embodiment of the present invention. The heat-shrinkable film 1 in FIG. 1 comprises an inner layer 2 and outer layers 3. The inner layer 2 comprises an ethylene-propylene-butene terpolymer. The outer layers 3 are arranged on or above both sides of the inner layer 2 and comprise a polyester resin.

The inner layer 2 comprises an olefinic resin containing an ethylene-propylene-butene terpolymer. The ethylene-propylene-butene terpolymer can be a copolymer using ethylene, propylene, and 1-butene as constitutive monomers and is preferably a copolymer prepared by copolymerizing monomers by the catalysis of a metallocene catalyst. The preferred ethylene-propylene-butene terpolymer can be prepared by copolymerization by the catalysis of a metallocene catalyst so as to improve the shrinkability at low temperatures of about 60° C. to about 80° C. and fittability to containers upon thermal shrinkage.

The metallocene catalyst can be a known or conventional metallocene catalyst for polymerization of olefins, such as the metallocene catalyst described in JP-A No. 2002-

215044. The copolymerization procedure is not specifically limited and can be any known polymerization procedure such as slurry polymerization, solution polymerization, and gas-phase polymerization. The ethylene-propylene-butene terpolymer preferably has an isotactic index of 90% or more, from the viewpoints of the shrinkability at low temperatures and the rigidity of the film.

The ethylene content of the ethylene-propylene-butene terpolymer is, for example, about 2 to about 5 percent by weight, and preferably about 3 to about 4.5 percent by weight. The ratio of propylene to 1-butene is, for example, in terms of molar ratio of about 20:80 to about 80:20, and preferably about 30:70 to about 70:30.

The ethylene-propylene-butene terpolymer can have a melting point of about 115° C. to about 140° C. As the ethylene-propylene-butene terpolymer, one having a melting point of about 130° C. or lower, for example about 120° C. to about 130° C., and preferably about 120° C. to about 125° C., is suitable for improving the shrinkability at low temperatures. In contrast, for excellent thermostability, an ethylene-propylene-butene terpolymer having a melting point of about 120° C. or higher, for example, about 120° C. to about 140° C., and preferably about 125° C. to about 140° C., is preferable.

The inner layer can comprise an ethylene-propylene-butene terpolymer alone, but desired properties can be imparted thereto by incorporating one or more other olefinic resins in addition to an ethylene-propylene-butene terpolymer. Examples of the other olefinic resins are polyethylenes; polypropylenes; propylene random copolymers including binary copolymers such as ethylene-propylene random copolymers; and amorphous cyclic olefinic polymers. Examples of the amorphous cyclic olefinic polymers include copolymers between a cyclic olefin and an alpha-olefin such as ethylene or propylene, graft-modified products of these copolymers, ring-opened polymers derived from a cyclic olefin, hydrogenated products thereof, and graft-modified products of them.

The amorphous cyclic olefinic polymers include (A) copolymers between at least one cyclic olefin and an alpha-olefin such as ethylene, propylene, 1-butene, 1-hexene, or 4-methyl-1-pentene (hereinafter also referred to as "cyclic olefinic copolymers"), and (B) ring-opened polymers derived from a cyclic olefin, and hydrogenated products thereof.

Examples of the cyclic olefin in the polymers (A) and (B) include polycyclic olefins such as bicyclo[2.2.1]hept-2-ene (norbornene), tetracyclo[4.4.0.1$^{2,5}$.1$^{7,10}$]-3-dodecene, hexacyclo[6.6.1.1$^{3,6}$.1$^{10,13}$.0$^{2,7}$.0$^{9,14}$]-4-heptadecene, octacyclo[8.8.0.1$^{2,9}$.1$^{4,7}$.1$^{11,18}$.1$^{13,16}$.0$^{3,8}$.0$^{12,17}$]-5-docosene, pentacyclo[6.6.1.1$^{3,6}$.0$^{3,6}$.0$^{2,7}$.0$^{9,14}$]-4-hexadecene, heptacyclo-5-icosene, heptacyclo-5-henicosene, tricyclo[4.3.0.1$^{2,5}$]-3-decene, tricyclo[4.3.0.1$^{2,5}$]-3-undecene, pentacyclo [6.5.1.1$^{3,6}$.0$^{2,7}$.0$^{9,14}$]-4-pentadecene, pentacyclopentadecadiene, pentacyclo[4.7.0.1$^{2,5}$0$^{8,13}$.1$^{9,12}$]-3-pentadecene, and nonacyclo[9.10.1.1$^{4,7}$.1$^{13,20}$.1$^{15,18}$.0$^{2,10}$. 0$^{12,21}$.0$^{14,19}$]-5-pentacosene. These cyclic olefins may have one or more substituents on their rings. Examples of the substituents are ester groups such as methoxycarbonyl, and ethoxycarbonyl groups; alkyl groups such as methyl group; haloalkyl groups; cyano group; and halogen atoms.

The cyclic olefinic copolymers (A) can be prepared, for example, by polymerizing the alpha-olefin and the cyclic olefin using a catalyst such as a "Ziegler catalyst" or a metallocene catalyst in a hydrocarbon solvent such as hexane, heptane, octane, cyclohexane, benzene, toluene, or xylene. Such cyclic olefinic copolymers (A) are commercially available, for example, under the trade name of "APEL" from Mitsui Chemicals, Inc. and the trade name of "TOPAS" from Ticona GmbH.

The ring-opened polymers derived from a cyclic olefin and hydrogenated products thereof (B) can be prepared, for example, by subjecting the cyclic olefin to metathesis polymerization (ring-opening polymerization) by the catalysis of a molybdenum compound or a tungsten compound, and generally further subjecting the resulting polymer to dehydrogenation. The polymers (B) are also commercially available, for example, under the trade names of "ARTON" from JSR, "ZEONEX" from ZEON CORPORATION, and "ZEONOR" from ZEON CORPORATION. Each of these amorphous cyclic olefinic polymers can be used alone or in combination.

Each of these olefinic resins can be used alone or in combination. Among them, polypropylenes and amorphous cyclic olefinic copolymers, for example, are preferred, since they are excellent in compatibility (miscibility) with an ethylene-propylene-butene terpolymer and can improve the rigidity and shrinkage stress of the film.

The content of the ethylene-propylene-butene terpolymer in the inner layer 2 is, for example, about 45 percent by weight or more (e.g., about 45 to about 100 percent by weight), and preferably about 50 percent by weight or more (e.g., about 50 to about 100 percent by weight) based on the total weight of the components of the inner layer 2. If the content is less than 45 percent by weight, the film may not have a sufficient interlayer bonding strength.

The olefinic resin constituting the inner layer 2, including the ethylene-propylene-butene terpolymer, and, if necessary, one or more other olefinic resins, may have a melting point of, for example, about 100° C. to about 140° C., and preferably about 110° C. to about 130° C. By using an olefinic resin having a melting point of 120° C. or more, the resulting film may be excellent in thermostability. The melting point is, for example, about 120° C. to about 140° C., and preferably about 125° C. to about 140° C. For improving the shrinkability at low temperatures, the olefinic resin preferably has a glass transition temperature (Tg) of about 50° C. to about 80° C., more preferably about 60° C. to about 80° C., and most preferably about 65° C. to about 75° C. The glass transition temperature Tg can be controlled by adjusting the types and proportions of monomer components.

The inner layer 2 preferably comprises 90 percent by weight or more of the olefinic resin based on the total weight of resin components constituting the inner layer 2 and can further comprise, if necessary, a small amount of one or more other polymers than the olefinic polymer.

The inner layer 2 may further comprise one or more tackifiers such as petroleum resins and terpene resins. The films according to the present invention, however, can exhibit sufficient interlayer adhesion without the addition of tackifiers, and such films without tackifiers are advantageous in cost and production stability.

The thickness of the inner layer 2 is, for example, about 10 to about 70 μm, and preferably about 20 to about 50 μm.

The outer layers 3 each comprise a polyester resin. Therefore, the resulting heat-shrinkable films have high rigidity, can highly shrink and can be tightly applied to overall of an adherend such as a container. In addition, they can be prevented from natural shrinkage and have improved handleability.

The polyester resin can be a polyester resin which is obtained by a known process such as condensation of a diol component and a dicarboxylic acid component or a reactive derivative thereof, such as an ester. The dicarboxylic acid component for constituting the polyester resin preferably comprises about 95 to about 100 percent by mole of terephthalic acid based on the total amount of the dicarboxylic acid component. Examples of the other dicarboxylic acid components than terephthalic acid include aliphatic dicarboxylic acids such as oxalic acid, malonic acid, succinic acid, glutaric acid, adipic acid, pimelic acid, suberic acid, azelaic acid, and sebacic acid; alicyclic dicarboxylic acids such as 1,4-decahydronaphthalenedicarboxylic acid, 1,5-decahydronaphthalenedicarboxylic acid, 2,6-decahydronaphthalenedicarboxylic acid, 1,3-cyclohexanedicarboxylic acid, and 1,4-cyclohexanedicarboxylic acid; and aromatic dicarboxylic acids such as isophthalic acid, 4,4'-biphenyldicarboxylic acid, trans-3,3'-stilbenedicarboxylic acid, trans-4,4'-stilbenedicarboxylic acid, 4,4'-dibenzyldicarboxylic acid, and naphthalenedicarboxylic acids including 2,6-naphthalenedicarboxylic acid. Each of these dicarboxylic acid components can be used alone or in combination.

The diol component constituting the polyester resin preferably mainly comprises ethylene glycol in a content of, for example, 50 percent by mole or more based on the total amount of the diol component. The diol component more preferably comprises ethylene glycol and 1,4-cyclohexanedimethanol in combination. Specifically, the total content of ethylene glycol and 1,4-cyclohexanedimethanol in the diol component is, for example, about 75 percent by mole or more (e.g., about 75 to about 100 percent by mole), and preferably about 80 to about 100 percent by mole based on the total amount of the diol component. The diol component preferably further comprises about 5 to about 20 percent by mole of diethylene glycol, for more excellent shrinkability at low temperatures. Examples of other diol components include aliphatic diols such as propylene glycol, 1,3-propanediol, 2,2-dimethyl-1,3-propanediol, 2-methyl-2-ethyl-1,3-propanediol, 2,2-diethyl-1,3-propanediol, 2-ethyl-2-butyl-1,3-propanediol, 1,3-butanediol, 1,4-butanediol, 1,6-hexanediol, and 2,2,4-trimethyl-1,6-hexanediol; thiodiethanol; polyalkylene glycols such as dipropylene glycol, polyethylene glycol, and polypropylene glycol; alicyclic diols such as 1,2-cyclohexanedimethanol and 1,3-cyclohexanedimethanol; and aromatic diols including ethylene oxide adducts of bisphenol compounds, such as 2,2-bis (4'-β-hydroxyethoxydiphenyl)propane and bis(4'-β-hydroxyethoxyphenyl)sulfone, and xylylene glycol. Each of these diol components can be used alone or in combination.

The outer layers 3, 3 may comprise 90 percent by weight or more of a polyester resin based on the total weight of resin components constituting the outer layers 3, 3 and may further comprise, if necessary, a small amount of one or more other polymers.

The outer layers 3, 3 each have a thickness of, for example, about 3 to about 20 μm and preferably about 3 to about 10 μm. The total thickness of the two outer layers 3, 3 occupies, for example, about 3% to about 50% and preferably about 5% to about 30% of the thickness of the heat-shrinkable film 1. If this ratio is less than 3%, the film may often become relaxed after thermal shrinkage, i.e., the tightening due to shrinkage may become loose.

The inner layer 2 and the outer layers 3, 3 in the heat-shrinkable films according to the present invention may further comprise, if necessary, one or more additives such as lubricants, fillers, thermal stabilizers, antioxidants, ultraviolet absorbers, antistatics, flame-retarders, and colorants.

Figure 2:
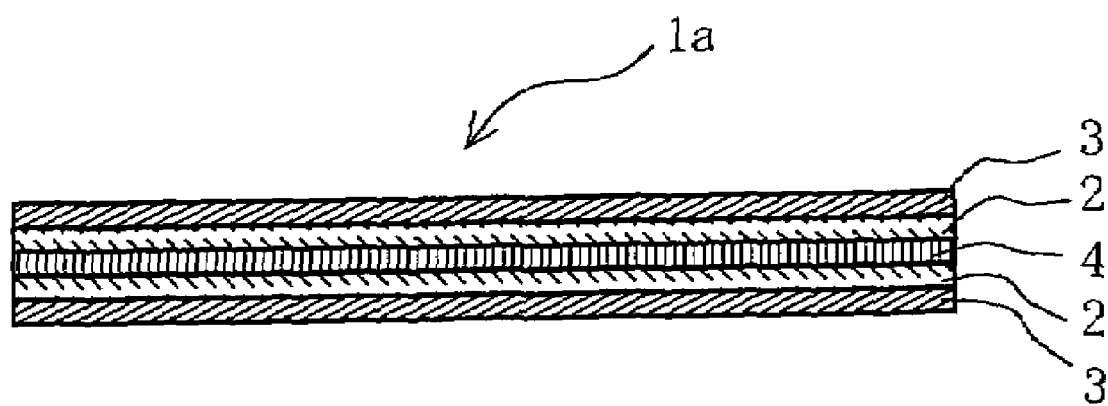
FIG. 2 is a schematic cross-sectional view of a heat-shrinkable film as another embodiment of the present invention.

Each of the inner layer 2 and the outer layers 3, 3 can comprise plural layers. In addition, the film may comprise one or more other layers within ranges not adversely affecting the rigidity and other properties of the film. Specific embodiments of the heat-shrinkable films according to the present invention include, for example, a film 1 in FIG. 1 having a layer configuration of (outer layer 3)/(inner layer 2)/(outer layer 3); and a film 1a in FIG. 2 having a layer configuration of (outer layer 3)/(inner layer 2)/(another resin layer 4)/(inner layer 2)/(outer layer 3). The other resin layer can be one or more known resin layers for constituting heat-shrinkable films within ranges not impairing the advantages of the present invention. Examples of the other resin layers include layers of olefinic resins such as polyethylenes.

The heat-shrinkable film 1 has a thickness of, for example, about 20 to about 80 μm and preferably about 30 to about 60 μm.

The heat-shrinkable film 1 can be produced according to a conventional procedure for the production of multilayer films, such as coextrution. The heat-shrinkable film 1 in FIG. 1 can be prepared, for example, by melting and extruding a resin composition containing a resin for the formation of the inner layer 2, and a resin composition containing a resin for the formation of the outer layers 3, 3 using an extruder with a T-die for forming three layers of different two compositions according to a feed block merging system; cooling the extrudate by a cooling roll; and drawing the cooled extrudate. In this procedure, a cyclic die can be used instead of a T-die.

The drawing (orientation) can be carried out according to any of a tentering system and a tube system. The drawing is generally conducted by drawing the extrudate about 3- to about 8-fold and preferably about 4- to about 6-fold in a width direction (transverse direction; traveling direction (TD)) at a temperature of about 80° C. to about 180° C., and preferably about 80° C. to about 150° C. If necessary, the extrudate may further be drawn in a longitudinal direction (vertical direction (machine direction (MD)) at a low drawing ratio of, for example, about 1.5-fold or less. The heat-shrinkable films according to the present invention include uniaxially oriented films which have been drawn only in one direction; and biaxially oriented films which have been mainly drawn in one direction and slightly drawn in a direction perpendicular to the one direction. The resulting heat-shrinkable film 1 has orientation in a width direction (a direction of main drawing) and shows thermal shrinkability in the direction.

The thermal shrinkage percentage in the main orientation direction X (direction in which main drawing is applied; the width direction in the above case) of the heat-shrinkable film 1 after immersing in hot water at 80° C. for five seconds is, for example, about 20% to about 80%, and preferably about 30% to about 70%. The heat-shrinkable films according to the present invention have the above configuration and can sufficiently shrink even at low temperatures or with low calories. They can therefore be easily and conveniently applied even to containers having curved surfaces. The thermal shrinkage percentage can be determined according to the following equation:

Thermal shrinkage percentage (%)=[{(Original length in the direction X)−(Length in the direction X after immersion)}/(Original length in the direction X)]×100

The thermal shrinkage percentage can be adjusted by selecting the types of resins constituting the inner layer 2 and the outer layers 3, 3 and drawing conditions such as drawing ratio as appropriate.

The heat-shrinkable film 1 according to the present invention has an interlayer bonding strength between the inner layer 2 and the outer layer 3 of 3.0 N/15-mm or more. The interlayer bonding strength indicates the tensile strength at the time when delamination occurs in a tensile test mentioned below. Specifically, a solvent (dioxolane) is applied as a band 3 mm wide in a direction perpendicular to a circumferential direction (machine direction (MD)) on one side end of a sample heat-shrinkable film, the portion where the solvent has been applied is overlaid 5 to 10 mm upon the other side and is subjected to center sealing. The resulting article is cut in a circumferential direction to a length in a machine direction (MD) of 15 mm. A T-type peel test is carried out according to Japanese Industrial Standards (JIS) K 6854-3 by pulling non-bonded portions of both ends using a tensile tester, and the tensile strength (peel strength in 15 mm width) at the time when peeling (delamination) between the outer layers 3 and the inner layer 2 constituting the film occurs is measured and is defined as the interlayer bonding strength. In this procedure, the upper limit of measurement of the tensile strength is 3.0 N/15-mm.

The heat-shrinkable film 1 according to the present invention does not need an extra adhesive layer, since the inner layer 2 and the outer layers 3 are firmly bonded to each other at such a high interlayer bonding strength. Consequently, the heat-shrinkable film can avoid problems caused by an adhesive layer, such as decreased shrinkability, impaired finish, and limited shapes of bottles as adherends. The heat-shrinkable film having the above-specified interlayer bonding strength can significantly prevent interlayer displacement upon center sealing or shrinkage to a high degree (for example, shrinkage at a shrinkage percentage of about 50% to about 60%).

The heat-shrinkable films according to the present invention exhibit a high shrinkage stress due to the polyester resin constituting the outer layers 3, have a reduced shrinkage percentages due to the polyolefin resin constituting the inner layer 2, and, when applied to adherends, yield good finish after shrinkage. The heat-shrinkable films according to the present invention preferably have a shrinkage stress in a main shrinkage direction (mainly in a transverse direction) of, for example, about 2.0 MPa or more, and more preferably about 4.0 MPa or more, for more excellent finish. The shrinkage stress of the films can be set as appropriate by selecting the constituting resins and the film thickness. The shrinkage stress herein is defined as the maximum shrinkage stress determined by cutting a sample film into a piece having a length of 15 mm in a direction perpendicular to the main drawing direction of the film (machine direction (MD)); setting the film piece in a chuck of a tensile tester at a chuck-to-chuck distance of 50 mm; and immersing in hot water at 95° C. for ten seconds.

The heat-shrinkable films according to the present invention can be used as base films of shrink labels. The shrink labels can be produced by printing a desired image or character on at least one side of the heat-shrinkable films according to a conventional printing procedure, such as gravure printing, to form a printed layer. The shrink labels may have one or more other layers in addition to a printed layer, such as an overcoat layer typically of an acrylic resin on a surface of the outer layers of the heat-shrinkable films, so as to prevent damage.

The shrink labels are formed into desired shapes before use, according to the purpose. For example, cylindrical shrink labels can be prepared by rolling (rounding) the shrink label into a cylinder so that the printed layer faces the inside and the main drawing direction (generally, a width direction) of the heat-shrinkable film is to be a circumferential direction, the both ends of the label are overlaid and bonded (center-sealed) using a solvent or by heat sealing to thereby form a continuous, long cylindrical shrink label, and the continuous, long label is cut into individual labels.

Shrink labels comprising the heat-shrinkable films according to the present invention are used by applying them to surfaces of containers. The containers can comprise any materials and can be, for example, any of plastic containers made typically of polyesters such as poly(ethylene terephthalate); glass containers; and metallic containers. The containers may have any shapes, such as a polygonal shape having a substantially square section, and a cylindrical shape having a substantially round section.

The shrink labels can be applied to containers by the following method. Specifically, a rolled continuous, long cylindrical shrink label is fed to an automatic labeling machine, is cut into necessary lengths while squeezing the label, is applied to an outer surface of a container generally filled with contents, is subjected to thermal shrinkage by allowing the same to pass through a hot-air tunnel or steam tunnel at a predetermined temperature or by heating the same with heat of radiation such as infrared radiation to thereby yield a labeled container. Thus, the shrink label comes into intimate contact with the container while fitting the shape of, for example, the shoulder of the container. Since the constitutive heat-shrinkable films according to the present invention exhibit good flexibility, the labeled containers have excellent finish after shrinkage.

The labeled containers using the heat-shrinkable films according to the present invention can be separated into containers and labels, and they can be recovered separately after use by using the difference in specific gravity therebetween. Specifically, when the shrink labels using the heat-shrinkable films according to the present invention are applied to poly(ethylene terephthalate) bottles, the plastic components of the shrink labels (heat-shrinkable films) can be easily separated from the poly(ethylene terephthalate) of the bottles in recycling, since the heat-shrinkable films each have a specific gravity of 1 or less.

The present invention will be illustrated in further detail with reference to several examples below, which by no means limit the scope of the present invention.

EXAMPLE 1

A resin composition for outer layers (b1) and a resin composition for inner layer (a1) were co-extruded from a T-die of an extruder for forming three layers of different two compositions according to a feed block merging system, and the co-extrudate was subjected to 5-fold tentering drawing in a width direction (TD) at 100° C. and thereby yielded a heat-shrinkable film having a layer configuration of (b1)/(a1)/(b1) and having a total thickness of 50 μm, a thickness of the inner layer (a1) of 30 μm, and a thickness of each of the outer layers (b1) of 10 μm. The resin composition (b1) comprises a polyester [a product of Eastman Chemical Company under the trade name of "Embrace"], and the resin composition (a1) comprises 80 parts by weight of an ethylene-propylene-butene terpolymer [a product of Sumitomo Chemical Co., Ltd. under the trade name of "Tafcelen 1102"] prepared by the catalysis of a metallocene catalyst, and 20 parts by weight of a polypropylene [a product of Sumitomo Chemical Co., Ltd. under the trade name of "S131"].

A test piece 10 cm wide and 10 cm long [10 cm in a width direction (traveling direction (TD)) and 10 cm in a longitudinal direction (machine direction (MD))] was cut from the above-prepared heat-shrinkable film; the test piece was immersed in hot water at 80° C. for five seconds; the length of the heat-shrinkable film in the width direction (TD) was measured, and the thermal shrinkage percentage was determined according to the above-mentioned equation to find that the heat-shrinkable film has a thermal shrinkage percentage of 40%.

Gravure printing of an image of eight colors was applied to one side of the heat-shrinkable film using a reactive urethane ink to form a printed layer. Thus, a shrink label was prepared.

The above-prepared shrink label was cut slits to predetermined widths and was wound as rolls. Each of the rolls was rewound, was rounded so that the width direction (TD) of the heat-shrinkable film became a circumferential direction and the printed layer faced inside, and both ends (not printed) was bonded (center-sealed) using an organic solvent (dioxolane) and thereby yielded a continuous, long cylindrical shrink label. The label was fed to an automatic labeling machine to cut into labels, and each label was fit over a 500-ml PET bottle container (a poly(ethylene terephthalate) container), was allowed to pass through a steam tunnel at a temperature of 80° C. to undergo thermal shrinkage and thereby yielded a labeled container shown in FIG. 2. The shrunk label sufficiently fitted and was come in intimate contact with the container. Thus, the labeled container excellent in finish after shrinkage was obtained.

EXAMPLE 2

A heat-shrinkable film was prepared by the procedure of Example 1, except for using a resin composition for inner layer comprising 50 parts by weight of the ethylene-propylene-butene terpolymer and 50 parts by weight of the polypropylene (each used in Example 1). The heat-shrinkable film has a thermal shrinkage percentage of 35%.

By using this heat-shrinkable film, a shrink label and a labeled container were prepared by the procedure of Example 1.

COMPARATIVE EXAMPLE 1

A heat-shrinkable film was prepared by the procedure of Example 1, except for using a resin composition for inner layer comprising the polypropylene alone instead of the ethylene-propylene-butene terpolymer and the polypropylene. The heat-shrinkable film has a thermal shrinkage percentage at 80° C. of 30%.

By using this heat-shrinkable film, a shrink label and a labeled container were prepared by the procedure of Example 1.

Evaluation Test

Interlayer Bonding Strength

A solvent (dioxolane) was applied as a band 3 mm wide in a direction (MD) perpendicular to a circumferential direction at one side end each of the heat-shrinkable films prepared according to Examples 1 and 2 and Comparative Example 1. The portion where the solvent had been applied was overlaid 5 to 10 mm on the other side end and was center-sealed. The resulting article was cut in a circumferential direction to a length in the machine direction (MD) of 15 mm. A T-type peel test was carried out according to JIS K 6854-3 by pulling non-bonded portions of both ends using a tensile tester, and the tensile strength (peel strength in 15-mm width) was determined. In the tensile test (peel test), delamination occurred between the outer layer and the inner layer constituting the film before the bonded portion of the film, which had been bonded by the action of the organic solvent, peeled. Thus, the interlayer bonding strength in this test was defined as the tensile strength at the time when the delamination occurred. The T-type peel test was conducted up to a tensile strength of 3 N/15-mm. The heat-shrinkable films according to Examples 1 and 2 show no delamination even at a tensile strength of 3 N. In contrast, the heat-shrinkable film according to Comparative Example 1 shows delamination at a tensile strength of 1.0 N. These results demonstrate that the heat-shrinkable films according to Examples 1 and 2 have improved interlayer bonding strengths as compared with the heat-shrinkable film according to Comparative Example 1.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A heat-shrinkable film comprising:
   outer layers comprising a polyester resin; and
   at least one inner layer being arranged between the outer layers and comprising an olefinic resin containing 45 percent by weight or more of at least one ethylene-propylene-butene terpolymer based on the total weight of the inner layer,
   wherein the film has an interlayer bonding strength between the inner layer and the outer layer of 3.0 N/15-mm or more.

2. The heat-shrinkable film of claim 1, wherein the inner layer comprises an ethylene-propylene-butene terpolymer alone or in combination with at least one olefinic resin selected from a group of polyethylenes, polypropylenes, propylene random copolymers including binary copolymers, and amorphous cyclic olefinic polymers.

* * * * *